United States Patent
Bocq et al.

(10) Patent No.: US 9,083,621 B2
(45) Date of Patent: Jul. 14, 2015

(54) POLICY-BASED MANAGEMENT METHOD FOR REMOTE MANAGEMENT OF HOME DEVICES

(75) Inventors: Sébastien Bocq, Woluwe-Saint-Lambert (BE); Arabinda Bose, Cedar Park, TX (US); Jeremy Remington, Austin, TX (US); Sven Van Den Bosch, Lochristi (BE)

(73) Assignee: Alcatel Lucent, Boulogne-Billancourt (FR)

( * ) Notice: Subject to any disclaimer, the term of this patent is extended or adjusted under 35 U.S.C. 154(b) by 2299 days.

(21) Appl. No.: 11/955,374

(22) Filed: Dec. 12, 2007

(65) Prior Publication Data

US 2008/0148347 A1 Jun. 19, 2008

(30) Foreign Application Priority Data

Dec. 13, 2006 (EP) ..................................... 06291917

(51) Int. Cl.
| | |
|---|---|
| *H04L 29/06* | (2006.01) |
| *H04L 12/24* | (2006.01) |
| *H04L 12/28* | (2006.01) |
| *H04M 11/06* | (2006.01) |

(52) U.S. Cl.
CPC .......... *H04L 41/0893* (2013.01); *H04L 41/082* (2013.01); *H04L 12/2856* (2013.01); *H04L 41/0879* (2013.01); *H04L 41/0886* (2013.01); *H04M 11/062* (2013.01)

(58) Field of Classification Search
None
See application file for complete search history.

(56) References Cited

U.S. PATENT DOCUMENTS

| | | | |
|---|---|---|---|
| 6,760,761 B1 | 7/2004 | Sciacca | |
| 7,373,661 B2 * | 5/2008 | Smith et al. | ..................... 726/15 |
| 7,409,709 B2 * | 8/2008 | Smith et al. | ..................... 726/15 |

(Continued)

FOREIGN PATENT DOCUMENTS

WO WO 03/083734 A2 10/2003

OTHER PUBLICATIONS

Nicodemos C. Damianou, "A Policy Framework for management of Distributed Systems", PhD Thesis—Department of Computing, Feb. 1, 2002 pp. 1-233, XP002426271.

(Continued)

*Primary Examiner* — Christopher Revak
(74) *Attorney, Agent, or Firm* — Hitt Gaines, PC

(57) ABSTRACT

Policy-based management method for remote management of a home device (3), said method comprising:
  a triggering step wherein the operational state of the home device (3) changes under occurrence of a triggering event belonging to one of the following event categories:
    a device event, where the event is automatically produced by the home device (3);
    a scheduled event, where the event is automatically produced by a clock;
    a user event, where the event is produced by a user;
  an evaluation step, wherein a home device management (HDM) server (9) evaluates at least one device selection criterion;
  a policy run cycle, wherein the HDM server (9) runs a policy on the home device (3), said policy being selected among the following policies:
    an activation policy if the triggering event is of the device type;
    a management policy if the triggering event is of the scheduled type;
    a transient policy if the triggering event is of the user type.

8 Claims, 3 Drawing Sheets

(56) References Cited

U.S. PATENT DOCUMENTS

| | | | |
|---|---|---|---|
| 7,711,947 B2* | 5/2010 | Smith et al. | 713/100 |
| 2002/0040396 A1 | 4/2002 | Yoshihara et al. | |
| 2004/0010327 A1 | 1/2004 | Terashima et al. | |
| 2005/0038875 A1 | 2/2005 | Park | |
| 2005/0235360 A1* | 10/2005 | Pearson | 726/23 |
| 2006/0031407 A1* | 2/2006 | Dispensa et al. | 709/219 |
| 2006/0092861 A1* | 5/2006 | Corday et al. | 370/256 |
| 2006/0168178 A1 | 7/2006 | Hwang et al. | |
| 2006/0236095 A1* | 10/2006 | Smith et al. | 713/153 |
| 2007/0168458 A1* | 7/2007 | Costa-Requena et al. | 709/217 |
| 2008/0066145 A1* | 3/2008 | Molen et al. | 726/1 |

OTHER PUBLICATIONS

Technical Report—DSL Forum TR-069—CPE Wan Management Protocol—May 2004—Complete Article.

* cited by examiner

POLICY-BASED MANAGEMENT METHOD FOR REMOTE MANAGEMENT OF HOME DEVICES

CROSS REFERENCE TO RELATED APPLICATIONS

This application claims the benefit of EP Application No. 06291917.0 filed Dec. 13, 2006, entitled "POLICY BASED SYSTEM MANAGEMENT," commonly assigned with this application and incorporated herein by reference.

TECHNICAL FIELD OF THE INVENTION

The present invention relates to the remote management of home devices from a remote network.

BACKGROUND OF THE INVENTION

Recent times have witnessed the wide spread of the Internet, not only for professional purpose, but also at home. Consumers are offered more and more home electronic devices equipped with Internet connect capabilities, such as digital subscriber line (DSL) modems, residential gateways (RGW), set-top boxes (STB) for digital television (DTV), Voice over the Internet Protocol (VoIP) terminal adapters, etc. Such devices are commonly called "home devices" or "customer premise equipment" (CPE) and are linked together to form a local area or home network (LAN) connected to a wide area network (WAN) such as the Internet.

CPEs have become such advanced devices that it has become almost impossible for the average user to undertake any configuration change, firmware upgrade, backup, restore, troubleshooting or other management operations without the help of a skilled technician.

Few years ago, network operators used to send technicians to the customers' premises for support (so-called "truck rolls"). However, they are now trying to save costs by reducing truck rolls. This is why many remote management solutions for CPEs have been proposed in the near past.

Management policies are disclosed in "CPE WAN Management Protocol", a technical report from the DSL Forum TR-069, produced by the DSL Home-Technical Working Group in 2004.

Remote management/control methods are disclosed in US patent applications no. 2006/0168178 (Hwang), 2005/0038875 (Park) and 2004/0010327 (Terashima).

Yet, there is still a need for improving the remote management of CPEs, allowing network operators to be capable of managing large numbers of CPEs in a fully automated manner.

SUMMARY OF THE INVENTION

In order to achieve the above and other objects, there is provided a policy-based management method for remote management of a home device, said method comprising:
- a triggering step wherein the operational state of the home device changes under occurrence of a triggering event belonging to one of the following event categories:
- a device event, where the event is automatically produced by the home device;
- a scheduled event, where the event is automatically produced by a clock;
- a user event, where the event is produced by a user;
- an evaluation step, wherein a home device management (HDM) server evaluates at least one device selection criterion (e.g. a device parameter, like the home device IP address, home device serial number or service identification);
- a policy run cycle, wherein the HDM server runs a policy on the home device, said policy being selected among the following policies:
- an activation policy if the triggering event is of the device type;
- a management policy if the triggering event is of the scheduled type;
- a transient policy if the triggering event is of the user type.

In a preferred embodiment, there is provided an exit step wherein the HDM server evaluates success or failure of the policy on the home device.

In a preferred embodiment, if the selected policy is the transient policy, a locking step is provided wherein the home device is locked before the beginning of the policy run cycle, and also an unlocking step wherein the home device is unlocked after completion of the policy run cycle.

The invention also provides a home device policy-based management system, comprising:
- means for identifying a triggering event belonging to one of the following event categories:
- a device event, where the event is automatically produced by the home device;
- a scheduled event, where the event is automatically produced by a clock;
- a user event, where the event is produced by a user;
- means for evaluating at least one device selection criterion;
- means for launching a policy run cycle on the home device, said policy being selected among the following policies:
- an activation policy if the triggering event is of the device type;
- a management policy if the triggering event is of the scheduled type;
- a transient policy if the triggering event is of the user type.

This management system may further comprise a policy repository database (PRD) wherein rules underlying the policies are implemented.

The invention further provides a computer program product described in a computer-readable format in order to execute a home device policy-based management method, comprising:
- instructions for identifying a triggering event belonging to one of the following event categories:
- a device event, where the event is automatically produced by the home device;
- a scheduled event, where the event is automatically produced by a clock;
- a user event, where the event is produced by a user;
- instructions for evaluating at least one device selection criterion;
- instructions for launching a policy run cycle on a home device, said policy being selected among the following policies:
- an activation policy if the triggering event is of the device type;
- a management policy if the triggering event is of the scheduled type;
- a transient policy if the triggering event is of the user type.

The above and other objects and advantages of the invention will become apparent from the detailed description of preferred embodiments, considered in conjunction with the accompanying drawings in which:

DETAILED DESCRIPTION

Figure 1:
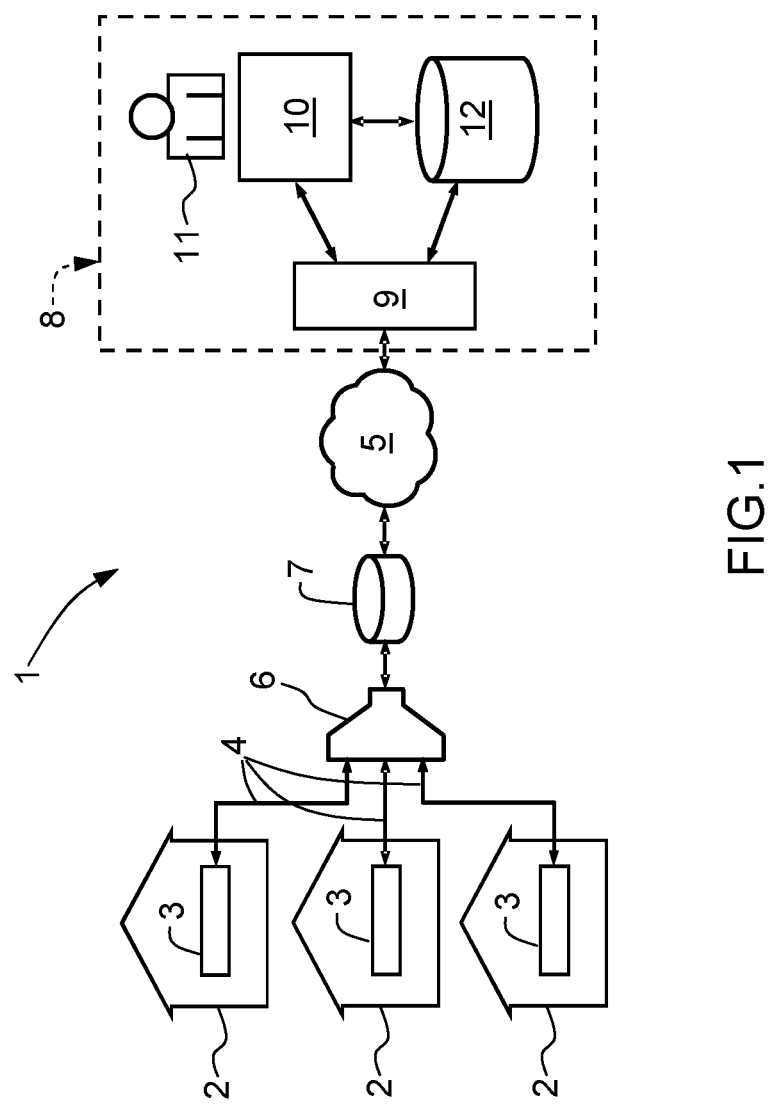
FIG. 1 is a block diagram showing a telecommunication environment for deployment of a remote management method according to an embodiment of the present invention.
Figure 3:
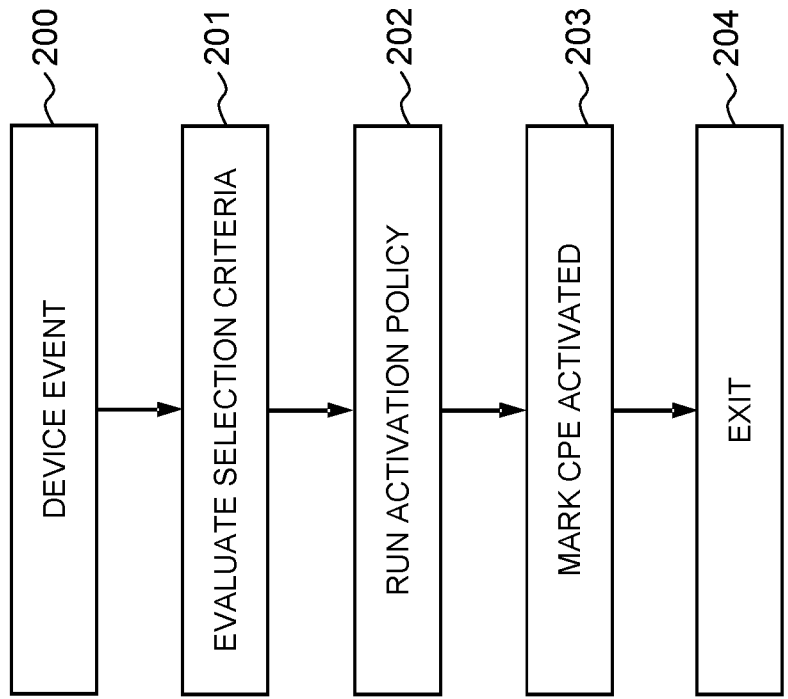
FIG. 2-5 are schematic flow charts illustrating operations in a management method according to an embodiment of the present invention.
Figure 2:
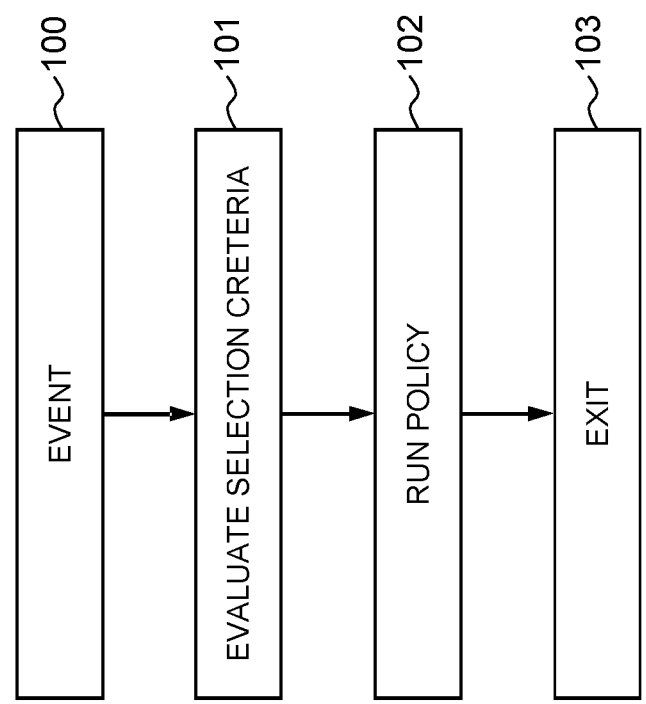
Figure 5:
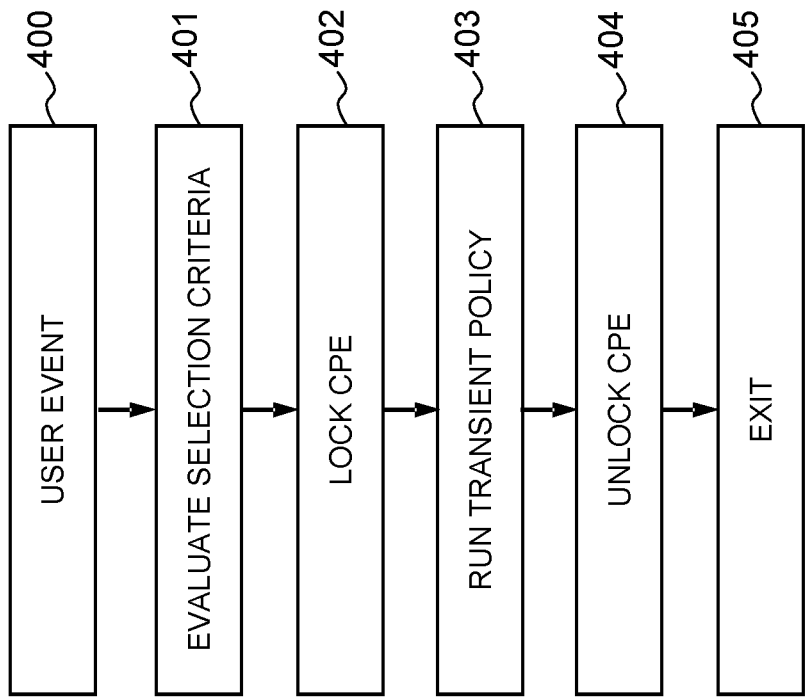
Figure 4:
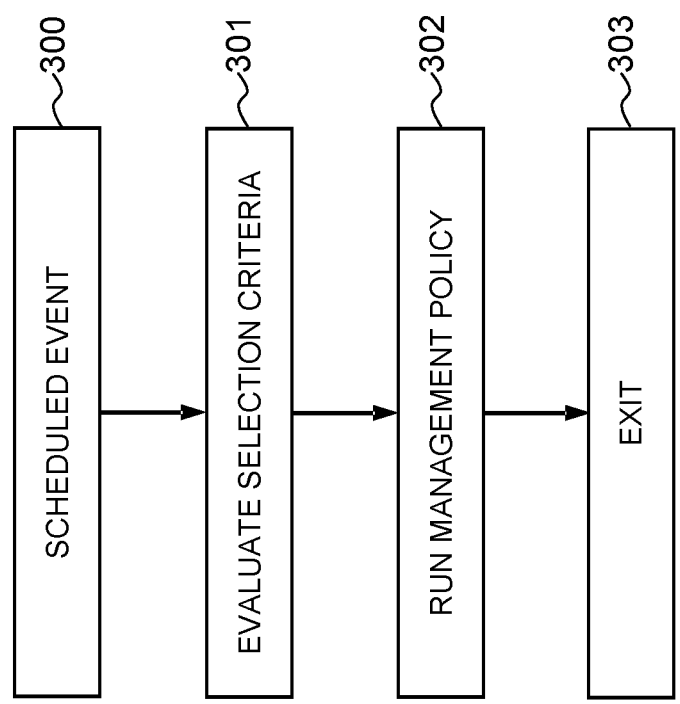

Turning now to the drawings and with particular attention to FIG. 1, there is shown a telecommunication system or environment 1 including customer (also called subscriber) premises 2 where at least one customer premises device (CPE) 3, such as a residential gateway (RGW) is installed and connected to a digital subscriber line (DSL) 4. The DSL line 4 links the CPE 3 to a large area network (LAN) 5 such as the Internet. Before it reaches the Internet 5, the signal goes through a digital subscriber line access multiplexer (DSLAM) 6 for aggregating the data streams and a broadband remote access server (BRAS) 7 for authenticating the subscriber's credentials and routing the data to the Internet 5.

The telecommunication environment 1 also includes a home device management system 8 in the form of a weblogic server domain connected to the Internet 5 and including the following interconnected items: at least one home device management (HDM) server 9, a user management console (UMC) 10 configured to be manually operated by a user or customer service representative (CSR) 11, and a policy repository database (PRD) 12.

HDM server 9 is designed to achieve remote policy-based management actions on CPEs 3. Management actions include CPE activation, firmware upgrades, service configuration, service update, diagnostics and backup/restore, troubleshooting (non-exhaustive list).

The CPE management policies include:
- an activation policy, which is to be used when activation operations have to be conducted on a CPE 3 or a group of CPEs 3,
- a management policy, which is to be used when predicted management operations have to be conducted on a CPE 3 or a group of CPEs 3, and
- a transient policy, which is to be used when at least one non predicted operation has to be conducted on a single CPE 3.

The rules underlying these different policies are implemented in the PRD 12.

Policies are run on a CPE 3 or a group of CPEs 3 under occurrence of at least one triggering event, which may belong to the following categories:
- a device event, where the event is automatically produced by the CPE 3;
- a scheduled event, where the event is automatically produced by a clock;
- a user event, where the event is produced by a user, like a CSR 11.

Activation policy is to be run on a CPE 3 when at least a device triggering event has occurred. Management policy is to be run on a CPE 3 when at least a scheduled triggering event has occurred, and transient policy is to be run on a CPE 3 when at least a user triggering event has occurred.

Whichever policy is to be run on the CPE 3, the management method comprises a triggering step 100 wherein the operational state of the CPE 3 changes or is about to change under occurrence of a triggering event.

There is then provided an evaluation step 101, wherein the HDM server 9 evaluates at least one device selection criterion in order for the policy to be correctly run on the correct CPE 3 or group of CPEs 3.

Once the criterion or criteria have been evaluated, there is provided a step 102 of the HDM server 9 running the selected policy on the CPE 3 or group of CPEs 3. HDM server 9 constantly monitors the result of the policy on the CPE 3.

Once the policy run cycle is over, there is provided an exit step 103 of the HDM server 9 evaluating exit criteria to evaluate policy success or failure.

When the policy has succeeded, there might be provided further management actions. In one embodiment, the HDM server 9 may launch another triggering event and run another policy on the CPE 3. In another embodiment, the HDM server 9 may assign a label (e.g. "CPE activated" or "service updated") to the CPE 3 and terminate the policy session.

When the policy has failed, there might be provided a retry cycle in which the failed policy is re-run on the CPE 3 (or group of CPEs 3).

Activation policy is used to activate a new CPE 3 with configuration parameters and/or firmware upgrades in order to provide the CPE 3 with a baseline configuration allowing it to be further managed (e.g. via a management policy, as will be disclosed hereinafter).

After a device event has occurred (step 200) (e.g. a customer has connected his new CPE 3 to a DSL line 4 and the CPE 3 sends a request for activation to the HDM server 9), the HDM server 9 evaluates at least one device selection criterion in order to check whether an activation policy can be run on the CPE 3 (step 201). For example, HDM server 9 checks whether the CPE 3 is provided with minimum configuration parameters. If the selection criterion is found invalid, HDM server 9 aborts the current session. Then, in an optional further step, HDM server 9 may execute a default action, e.g. transfer CPE 3 to a walled garden HDM server for preactivation.

If on the contrary the selection criterion is found valid, the HDM server 9 runs the activation policy on the CPE 3 (step 202). HDM server 9 tracks in real time the result of the activation policy.

If the activation policy has run successfully, the HDM server 9 may execute some further actions. One possible action consists for the HDM server 9 in assigning a label to the CPE 3, according to which CPE 3 is marked as "activated" (step 203). Another possible action consists for the HDM server 9 in launching a new triggering event in order to subsequently run another policy on the CPE 3 (e.g. a management policy), thereby exiting the activation management session (step 204).

One selection criterion evaluated by the HDM server 9 may consist of the CPE type. This allows the HDM server 9 to create different CPE groups, depending on the device type, which are to be activated independently or according to different action programs.

Management policy is used to configure new services, update existing services, run diagnostics, or even do backup and/or restore actions on a single CPE 3 or a group of CPEs 3. It is to be noted that management policy can be run on activated CPEs 3 only. As stated hereinabove, management policy can be run immediately after successful completion of activation policy.

Management policy is triggered after a scheduled event has occurred. A scheduled event might be either system-configured (i.e. in a automatic manner) or user-configured (i.e. it is programmed on-demand by a user, like a CSR 11).

As an example, a backup action might be system-scheduled (e.g. every three months) for a group of CPEs 3 in order to achieve periodic backup. In another example, a firmware upgrade action may be user-scheduled for a group of CPEs 3 in order to achieve a firmware upgrade everyday during a predetermined cycle period.

After a scheduled event has occurred (step 300), the HDM server 9 evaluates at least one device selection criterion in order to check whether, and under which conditions, a management policy can be run on the CPE 3 or group of CPEs 3 (step 301).

In the management policy the selection criteria are used to identify a single CPE 3 or a desired group of CPEs 3 on which the policy is to be run. This identification can be achieved through a combination of filtering rules based on CPE parameter or user-defined tags (i.e. text fields in the PRD 12, in which CPE qualifiers can be configured). For example, CPEs 3 can be grouped using the following selection criteria: CPE protocol, CPE type, software version, or firmware version.

If selection criteria are found invalid for a CPE 3 or a group of CPEs 3, HDM server 9 aborts the current management session. If on the contrary selection criteria are found valid, the management policy is run on the CPE 3 or group of CPEs 3 (step 302), provided that the CPEs 3 are already online or available. If the CPEs 3 are online or available, the policy is immediately run on the CPEs 3. If not, the policy actions to be undertaken by the HDM server 9 are queued for the targeted CPEs 3 until the CPEs 3 come online or become available, or until the queued actions expire after a predetermined time (in which case the management policy is considered by the HDM server 9 as having failed and rescheduled). The management session is then terminated (step 303).

Transient policy is used to create a specific action, e.g. a troubleshoot, diagnostic or debug action, to be run on a single CPE 3 by a user (or CSR 11).

Transient policy is triggered by a user event (step 400), e.g. after a subscriber has called a helpdesk to report a malfunction in a CPE 3. Search selection criteria are evaluated in order to identify the CPE 3 (step 401). Once the CPE 3 has been identified, the CPE 3 is locked by the CSR 11 (step 402) in order to prevent any other policy to start running during the transient policy session. The possible other pending policy actions are suspended. The transient policy is then run on the CPE 3 (step 403). Once the policy run cycle is achieved (either successfully or unsuccessfully), the CPE 3 is unlocked (step 404), the transient session is terminated (step 405) and the suspended actions targeting this specific CPE 3 are resumed.

This management method provides the capability of managing a large number of CPEs in an automated manner, as well as conducting unpredicted actions on a single CPE, under control of a user like a CSR.

The management method described hereinbefore can be executed through a computer program product implemented in a central processor of the HDM server and described in a computer-readable format in order. The program includes:
 instructions for identifying the triggering event,
 instructions for evaluating the device selection criterion or criteria;
 instructions for launching the policy run cycle on the CPE 3.

The invention claimed is:
1. Policy-based management method for remote management of a home device (3), said method comprising:
 a triggering step wherein the operational state of the home device (3) changes under occurrence of a triggering event belonging to one of the following event categories:
  a device event, where the event is automatically produced by the home device (3);
  a scheduled event, where the event is automatically produced by a clock; and
  a user event, where the event is produced by a user;
 an evaluation step, wherein a home device management (HDM) server (9) evaluates at least one device selection criterion; and
 a policy run cycle, wherein the HDM server (9) runs a policy on the home device (3), said policy being selected among the following policies:
  an activation policy if the triggering event is of the device type;
  a management policy if the triggering event is of the scheduled type; and
  a transient policy if the triggering event is of the user type.

2. Policy-based management method according to claim 1, further comprising an exit step wherein the HDM server (9) evaluates success or failure of the policy on the home device (3).

3. Policy-based management method according to claim 1, wherein, in the evaluation step, the at least one device criterion is a device parameter.

4. Policy-based management method according to claim 3, wherein the at least one device criterion is selected among the following: home device IP address, home device serial number, service identification.

5. Policy-based management method according to claim 1, further comprising, if the selected policy is the transient policy, a locking step wherein the home device (3) is locked before the beginning of the policy run cycle, and an unlocking step wherein the home device (3) is unlocked after completion of the policy run cycle.

6. Home device policy-based management system, comprising:
 means (9) for identifying a triggering event belonging to one of the following event categories:
  a device event, where the event is automatically produced by the home device (3);
  a scheduled event, where the event is automatically produced by a clock; and
  a user event, where the event is produced by a user;
 means (9) for evaluating at least one device selection criterion; and
 means (9, 10) for launching a policy run cycle on the home device (3), said policy being selected among the following policies:
  an activation policy if the triggering event is of the device type;
  a management policy if the triggering event is of the scheduled type; and
  a transient policy if the triggering event is of the user type.

7. Home device policy-based management system of claim 6 further comprising a policy repository database (PRD) (12) wherein rules underlying the policies are implemented.

8. Computer program product described in a computer-readable format in order to execute a home device policy-based management method, said product comprising a non-transitory medium, said non-transitory medium including:
 instructions for identifying a triggering event belonging to one of the following event categories:

a device event, where the event is automatically produced by the home device (3);
a scheduled event, where the event is automatically produced by a clock; and
a user event, where the event is produced by a user;
instructions for evaluating at least one device selection criterion; and
instructions for launching a policy run cycle on a home device, said policy being selected among the following policies:
an activation policy if the triggering event is of the device type;
a management policy if the triggering event is of the scheduled type; and
a transient policy if the triggering event is of the user type.

* * * * *